United States Patent [19]
Shieh

[11] Patent Number: 5,114,167
[45] Date of Patent: May 19, 1992

[54] LOCKING APPARATUS FOR USE IN A MOTOR CYCLE STAND

[76] Inventor: Jin-Ren Shieh, No. 178, Shih Chia Rd., Taichung, Taiwan

[21] Appl. No.: 638,572

[22] Filed: Jan. 8, 1991

[51] Int. Cl.$^5$ .......................................... B62H 00/00
[52] U.S. Cl. .................................. 280/297; 280/302; 70/235
[58] Field of Search ........................ 70/233, 234, 235; 280/293, 295, 296, 297, 301, 302, 303; 180/219

[56] References Cited

U.S. PATENT DOCUMENTS

| 4,298,211 | 11/1981 | Shitamori | 70/235 |
| 4,725,075 | 2/1988 | Biancardi | 280/297 |

FOREIGN PATENT DOCUMENTS

| 2449024 | 10/1980 | France | 70/235 |
| 2598669 | 11/1987 | France | 70/235 |

Primary Examiner—Charles A. Marmor
Assistant Examiner—Anne Marie Boehler
Attorney, Agent, or Firm—Cushman, Darby & Cushman

[57] ABSTRACT

A locking apparatus for use in a motor cycle stand is disclosed. The apparatus comprises a main shaft pivotally mounted in the axial hole of the motor cycle stand, a roller connected to one end of the main shaft, a roller jacket being fastened to the motor cycle body by means of a position lever and having a braking portion disposed therein, a braking device associated with the roller and the roller jacket, a locking device comprising a lock body coupled with the roller jacket and a lock core housed in the lock body, and a clutch comprising an activator and a driven member housed in the lock body and a spring member sandwiched between the activator and the driven member. The braking device housed in a roller operates in close cooperation with a roller jacket to stop the motion of the roller. The lock core can be rotated and pushed forward by a key to activate the driven member, which, in turn, locks up the roller in order to immobilize the motor cycle stand.

7 Claims, 3 Drawing Sheets

LOCKING APPARATUS FOR USE IN A MOTOR CYCLE STAND

BACKGROUND OF THE INVENTION

The conventional theft-proof locking apparatus for use in a motor cycle comprises a lock body and a U-shaped lock rod. The lock body has a lock core mechanism disposed therewithin and two parallel through holes arranged at both right and left sides thereof. Located at the inner sides near tips of lock rods are a plurality of triangular lock grooves. The U-shaped lock rod is placed through the gap of steel spokes of the front wheel in front of the front shock absorbers, and then the lock body is coupled with the tip portions of the lock rods so as to permit the lock core mechanism of the lock body to engage with triangular lock grooves of the lock rods.

In addition to an incommodity of the locking process mentioned above, it is often necessary to rotate the front wheel slightly in order to facilitate the locking process. Furthermore, the locking apparatus is prone to be misplaced or lost, because a motor cycle does not provide a compartment designated for its storage. It is neither desirable nor safe to have the locking apparatus hanged aimlessly on the motor cycle.

SUMMARY OF THE INVENTION

The primary objective of the invention is to provide a locking apparatus for use in a motor cycle stand, which can be mounted on a motor cycle body, regardless of its model.

It is another objective of the invention to provide a locking apparatus for use in a motor cycle stand, which can be mounted on a motor cycle body without having to reconstitute the body structures of a motor cycle to accommodate an addition of the locking apparatus.

It is still another objective of the invention to provide a locking apparatus for use in a motor cycle stand, which is designed to prevent hazardous materials such as steam and filth from entering the locking apparatus.

In keeping with the principles of the invention, the objectives are accomplished by a locking apparatus which comprises a main shaft pivotally mounted in the axial hole of the motor cycle stand, a roller connected to one end of the main shaft, a roller jacket being fastened to the motor cycle body by means of a position lever and having a braking portion disposed therein, a braking device associated with the roller and the roller jacket, a locking means comprising a lock body coupled with the roller jacket and a lock core housed in the lock body, and a clutch means comprising an activator and a driven member housed in the lock body and a spring member sandwiched between the activator and the driven member.

The locking apparatus of the invention is characterized in the facts that a braking device housed in a roller operates in close cooperation with a roller jacket to stop the motion of the roller and that the lock core of a locking means can be rotated and pushed forward for a predetermined distance.

Another important feature of the invention is that the clutch means comprises an activator which is coupled with the lock core and a driven member which is coupled with the roller. The activator and the driven member are kept apart by means of a clutch spring.

As soon as a key is inserted into the key hole to rotate the lock core clockwise, the driven member is subsequently activated to lock up the roller. As a result, both main shaft and motor cycle stand are immobilized. To release the motor cycle stand, a key is inserted into the key hole to rotate the lock core counter-clockwise to unlock both main shaft and motor cycle stand.

DETAILED DESCRIPTION OF THE PREFERRED EMBODIMENT

Figure 1:
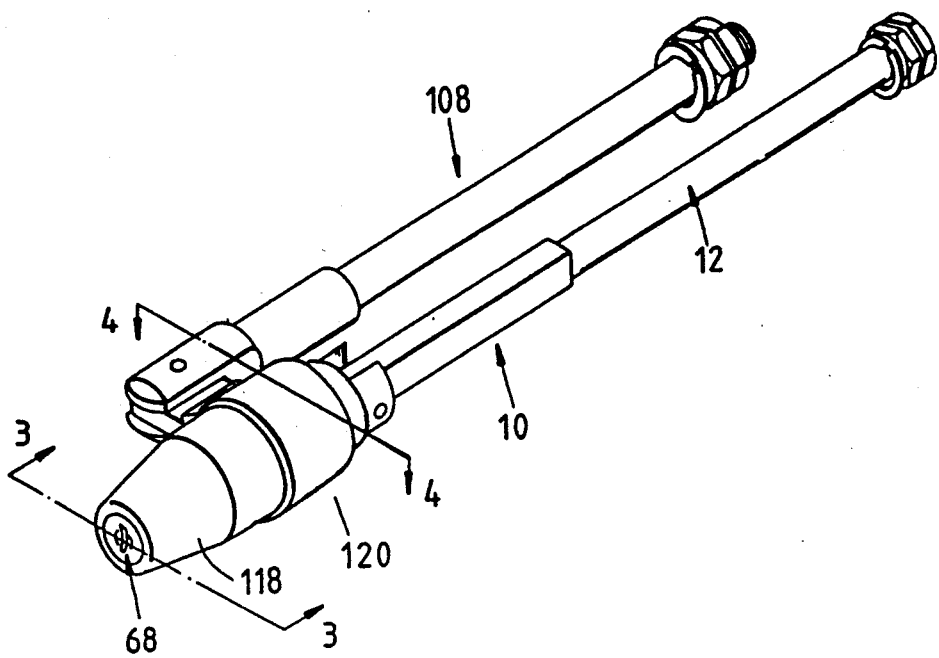
FIG. 1 shows a three-dimensional view of the preferred embodiment of the invention.
Figure 3:
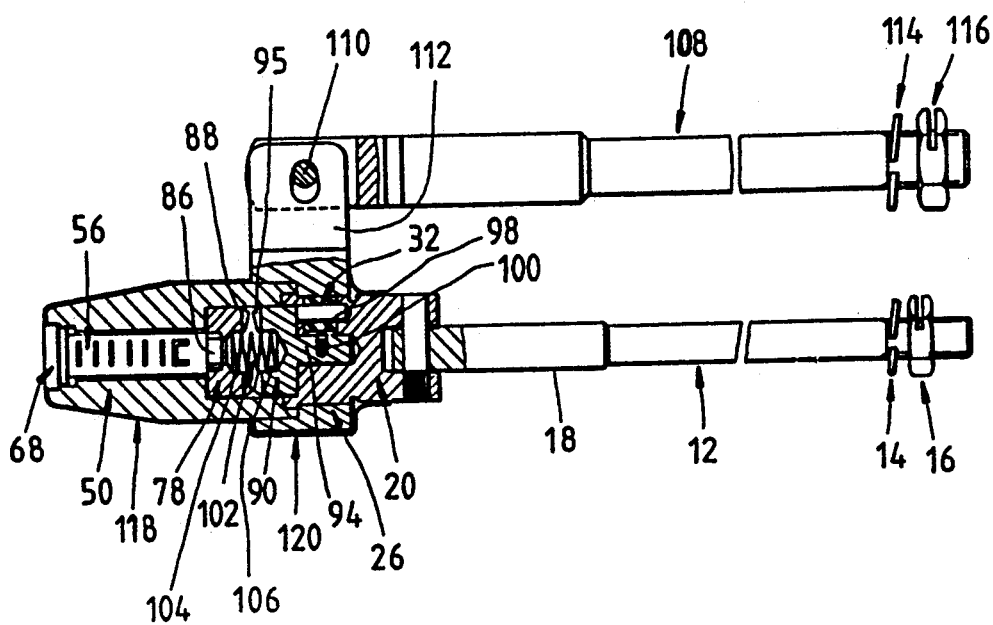
FIG. 3 shows an enlarged cut-away view of a portion taken along line 3—3 as shown in FIG. 1.
Figure 2:
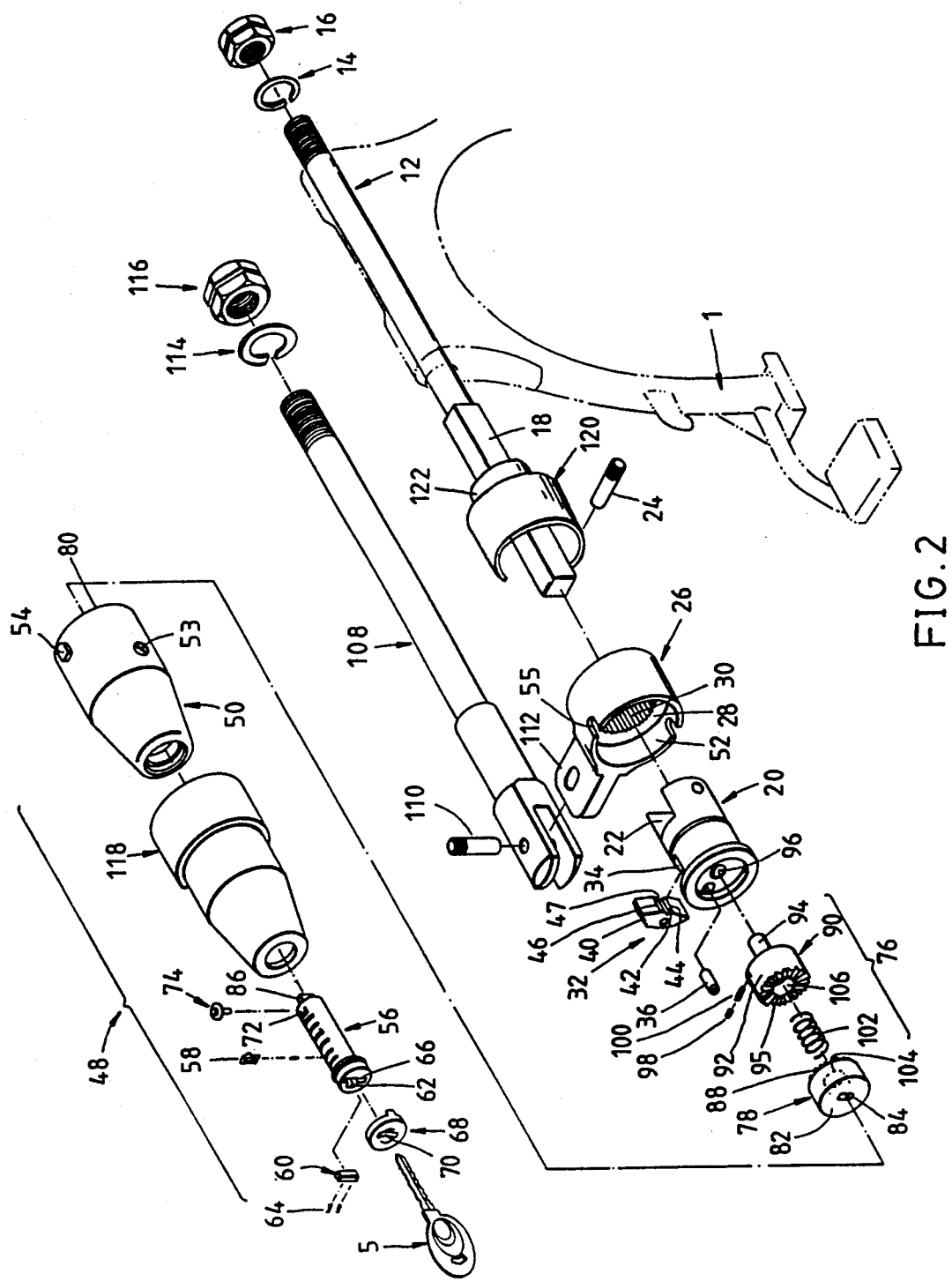
FIG. 2 shows an exploded view of the preferred embodiment of the invention.
Figure 4:
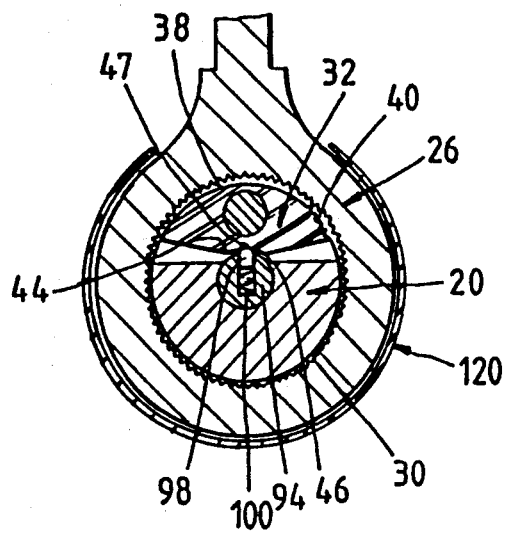
FIG. 4 shows an enlarged cross-sectional view of a portion taken along line 4—4 as shown in FIG. 1, in which the braking device is shown at its threshold position.
Figure 5:
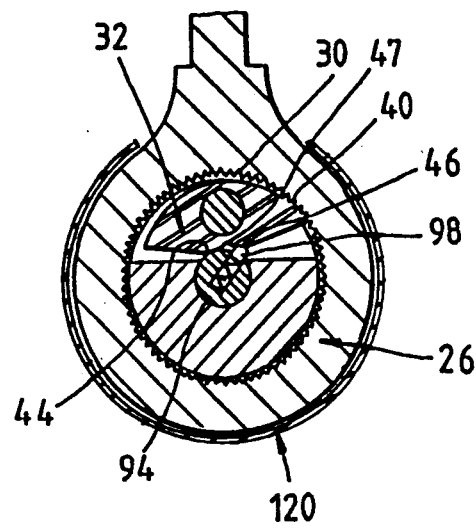
FIG. 5 shows an enlarged cross-sectional view of a portion taken along line 4—4 as shown in FIG. 1, in which the braking device is shown at a position where a counter-clockwise braking action is brought about as a result of the driven member being turned to the right.
Figure 6:
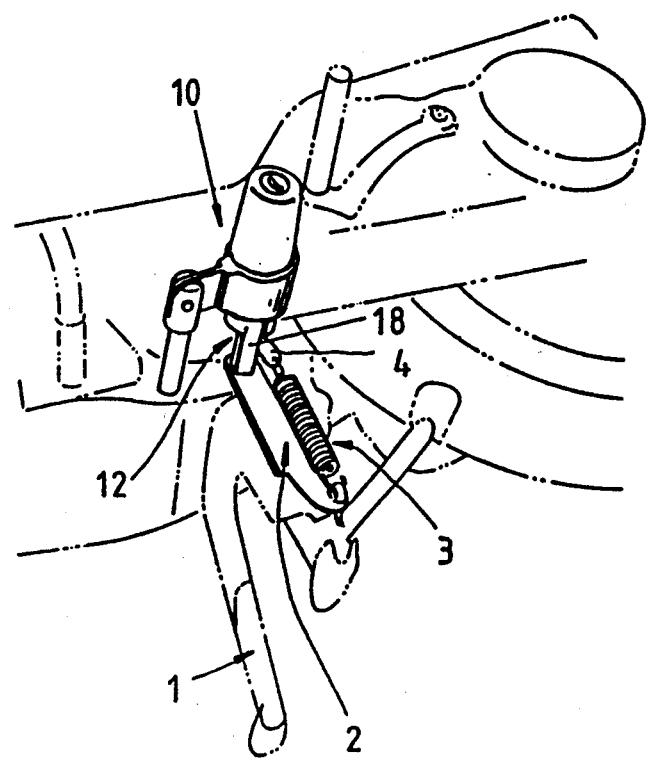
FIG. 6 shows a three-dimensional schematic view of the preferred embodiment of the invention which is mounted on the stand of a slightly inclined motor cycle body.

Referring to FIGS. 1-6, the locking apparatus 10 of a motor cycle stand is shown comprising a main shaft 12 pivotally mounted in the axial hole of the motor cycle stand 1. The one end of the main shaft is stationed by means of a washer 14 and a nut 16; the other end includes a rectangular portion 18 to which the one end of spring holder 2 is affixed. The other end of the spring holder 2 is hooked to the motor cycle stand 1. The one end of the torsion spring 3 of the motor cycle stand 1 is fastened to the motor cycle body by means of a hook piece 4, while the other end of the torsion spring 3 is attached securely to the spring holder 2, as shown in FIGS. 2 and 6. Therefore, the motor cycle stand 1 can be forced to spring upward by virtue of a stress generated by the torsion spring 3.

The locking apparatus 10 of a motor cycle stand 1 further comprises a roller 20 having an indentation 22 located at one end thereof to accommodate the leading edge of rectangular portion 18 of the main shaft 12. The roller 20 and the main shaft 12 are thus joined firmly by or in a toggle joint by means of an axial pin 24. A roller jacket 26 has an inner portion 28 of a smaller diameter with an indented circumference 30 disposed thereon. The inner portion 28 of the roller jacket 26 is used to encase the front portion of the roller 20. A fan-shaped braking device 32 is housed in the fan-shaped hole 34 and is hinged firmly to the roller 20 by means of an axial pin 36. The upper portion of the braking device 32 constitutes a braking surface 38 whose right side has an indented portion 40 disposed thereon and whose bottom portion has an arching recess 42 constructed thereinto. The arching recess 42 has two edge lines 44 and 46 arranged thereon and a cavity 47 positioned in the center thereof.

A locking means 48 comprises a lock body 50 whose one end is housed in the inner portion 52 of the roller jacket 26, where the diameter is greater than that of inner portion 28 mentioned previously. A lock body 50 has two ridges 54 which are arranged at opposite sides thereof and are so constructed as to fit into the hollow places 55 of the roller jacket 26 in order to ensure a secure coupling of the lock body 50 and the roller jacket 26. A lock core 56, which is housed in the lock body 50, comprises a plurality of fence pieces 58 embedded thereinto. In conjunction with two coiled springs 64, a water-proof block 60 is inlaid into the slot 62 located at the front end of the lock core 56. A cover piece 68 with a key hole 70 is affixed to the front end of the lock core 56. When a key 5 is inserted into the lock core 56 via the key hole 70 of the cover piece 68, it pushes the water-proof block 60 aside to permit the entry of the key 5 into the key hole 66 of the lock core 56. In addition, the rear end of the lock core 56 has a U-shaped groove 72 disposed thereon at the position corresponding to that of the pin hole 53 of the lock body 50. A guide pin 74 is pressed firmly into the pin hole 53 to reach the U-shaped groove 72 in order to guide the action of the lock core 56.

A clutch means 76 comprises a wheel-shaped activator 78 housed in the cell 80 located at the rear end of the lock body 50. The front side 82 of the activator 78 has a blind hole 84 disposed therein for accommodating the protruded ear 86 located at the rear end of the lock core 56, while the rear side of the activator 78 is constructed as an indented portion 88. The clutch means 76 further comprises a driven member 90 having a wheel-shaped portion 92 and an axis 94 located at the rear side of the driven member 90. In addition, the front end portion of the driven member 90 has an indented portion 95 disposed thereon. The axis 94 engages with an axial hole 96 which is located at front end of the roller 20 and communicates with the fan-shaped hole 34 of the roller 20. A steel pin 98 and a coiled spring 100 are disposed on the surface of the axis 94. The braking device 32 is at a threshold position when the steel pin 98 makes contact with the cavity 47 of the braking device 32, as shown in FIG. 4. When the driven member 90 is rotated to the right at a certain angle, the lateral portion of the steel pin 98 is oriented in the axial hole 96 and is in contact with the edge line 46 located on the right side of the arching recess 42. As a result, the right side of the braking device 32 is raised so that its indented portion 40 becomes engaged with indented circumference 30 of the roller jacket 26, resulting in a counter-clockwise braking action, as shown in FIG. 5. A clutch spring 102 is lodged in the central cells 104 and 106 and is sandwiched between the activator 78 and the driven member 90, which are kept apart by virtue of the tension of the clutch spring 102. When an external force is exerted on the activator 78, the indented portion 88 of the activator 78 is induced to engage with the indented portion 95 of the driven member 90 as a result of a constriction of the clutch spring 102.

By means of an insertion pin 110, the front end portion of the position lever 108 is joined in a toggle joint, with a wing piece 112 extending sideward from the roller jacket 26. The position lever 108 is fastened securely to a predetermined position located under the motor cycle body. The threaded end portion of the position lever 108 is set securely by means of a washer 114 and a nut 116 for orienting the roller jacket 26.

The locking apparatus 10 embodied in the present invention further comprises an anterior water-proof jacket 118, which is used to house the lock body 50 as well as the roller jacket 26. The cover piece 68 of the locking mechanism 48 is affixed to the front end of the water-proof jacket 118. The front portion of posterior water-proof jacket 120 embraces the anterior water-proof jacket 118, while its rear end portion 122 encircles the naked portion of the roller 20 extending beyond the rear end of the roller jacket 26. As a result, an intrusion of steam or filth into the locking apparatus 10 is effectively averted.

When the locking apparatus 10 is unlocked, the guide pin 74 is lodged in perpendicular groove located on the right side of the U-shaped groove 72 of the lock core 56. Accordingly, the activator 78 and the driven member 90 are kept apart by the clutch spring 102, and the steel pin 98 is forced by a coiled spring 100 to remain in the cavity 47 of braking device 32. In other words, the roller 20 is not activated. Therefore, the motor cycle stand 1 can be freely lifted or pushed down.

The process of activating the locking apparatus 10 of the motor cycle stand 1 is expounded hereinafter. The key 5 is inserted into the key hole 66 of the lock core 56 and is subsequently pushed further in. Under the assistance of the guide pin 74, the lock core 56 is pushed forward for a predetermined distance along the perpendicular groove located on the right side of the U-shaped groove 72 until such time when the guide pin 74 is located at the transverse groove of the U-shaped groove 72. At this time, the activator 78 has overcome the tension of the clutch spring 102 so that its indented portion 88 engages with the indented portion 95 of the driven member 90. As soon as the key 5 is turned clockwise at a predetermined angle, the driven member 90 rotates accordingly. As a result, the steel pin 98 on axis 94 moves along the arching recess 42 to lodge on edge line 46, and the indented portion 40 of the braking device 32 is lifted to engage with the indented portion 30 of the roller jacket 26 which is fastened to the position lever 108. For this reason, the roller 20 is not capable of turning counter-clockwise, neither is the main shaft 12. Therefore, the motor cycle stand 1 is locked and can not be thus lifted by force. The key 5 can be pulled out by now, allowing the clutch spring 102 to exert pressure on the activator 78, which, in turn, makes the lock core 56 to resume it threshold position under the assistance of the guide pin 74 which travels in the U-shaped groove 72. To unlock the locking apparatus 10 of the motor cycle stand 1, the reverse of the process described above should be employed.

The advantages of the locking apparatus 10 embodied in the present invention include its being incorporated easily into a motor cycle body, its relative convenience for use by a rider, its outstanding capacity for sustaining a heavy burden of tension, its water-proofing, and its being applicable to all models of motor cycles.

The embodiment of the invention described above is to be considered in all respects as merely an illustration of principles of the invention. Accordingly, the invention is to be limited only by the scope of the hereinafter appended claims.

What I claim is:

1. A locking apparatus for use in a motor cycle stand, comprising:
   a main shaft pivotally mounted in an axial hole of the motor cycle stand;
   a roller connected to one end of said main shaft;
   a position lever having means for fastening to a motor cycle body;
   a roller jacket fastened to said position lever, said roller jacket having a braking device disposed therein; said braking device connected between said roller and said roller jacket;

a lock body coupled with said roller jacket and a lock core housed in said lock body; and a clutch means for engaging and disengaging said braking device, said clutch means comprising an activator and a driven member housed in said lock body, and a spring member sandwiched between said activator and said driven member.

2. A locking apparatus in accordance with claim 1, wherein said roller is coupled with said main shaft by a toggle joint, and wherein said roller jacket is fastened to said position lever by a toggle joint.

3. A locking apparatus in accordance with claim 1, wherein said roller has a cell disposed therein; wherein said braking device is housed in said cell and is hinged to said roller by means of an axial pin parallel to an axial center of said roller, said braking device having a braking indented portion and wherein said roller jacket has a braking indented circumference disposed therein.

4. A locking apparatus in accordance with claim 1, wherein said driven member has a wheel portion, and an indented portion disposed on one side of said wheel portion; wherein said activator has a wheel-shaped portion, and an indented portion disposed on one side of said wheel portion for engaging with said indented portion of said driven member.

5. A locking apparatus in accordance with claim 4, wherein said wheel portion of said driven member has an axis of a predetermined length extending outward from the other side thereof, said axis being engaged with an axial hole of said roller, a coiled spring and a steel pin being disposed on a surface of said axis.

6. A locking apparatus in accordance with claim 4, wherein said wheel-shaped portion of said activator has a blind hole disposed therein, said lock core has a protruded ear disposed at a rear end thereof for accommodating said blind hole.

7. A locking apparatus in accordance with claim 1, wherein said lock core has a U-shaped groove located at the rear end thereof, wherein said lock body has a guide pin mounted thereon at a position corresponding to said U-shaped groove, said guide pin being lodged in said U-shaped groove to guide

* * * * *